United States Patent [19]

Takei et al.

[11] 4,273,361
[45] Jun. 16, 1981

[54] SEAT BELT SYSTEM FOR VEHICLE

[75] Inventors: Toshihiro Takei, Okazaki; Satosi Kuwakado, Aza Mitsuishi; Eiji Takakuwa; Toshiaki Shimogawa, both of Okazaki, all of Japan

[73] Assignee: Nippon Soken, Inc., Nishio, Japan

[21] Appl. No.: 929,782

[22] Filed: Jul. 31, 1978

[30] Foreign Application Priority Data

Aug. 5, 1977 [JP] Japan .................. 52-105467[U]

[51] Int. Cl.³ .............................................. B60R 21/10
[52] U.S. Cl. .................................... 280/805; 280/806; 297/470; 297/478
[58] Field of Search ............... 280/745, 746, 747, 744, 280/805, 801, 806, 807, 808; 297/386, 385, 384, 388, 389, 468, 470, 471, 472, 478; 188/1 C

[56] References Cited

U.S. PATENT DOCUMENTS

| | | | |
|---|---|---|---|
| 3,289,792 | 12/1966 | Moberg ............................ | 280/805 X |
| 3,952,967 | 4/1976 | Barile et al. ..................... | 280/805 X |
| 4,027,905 | 6/1977 | Shimogawa et al. ............. | 280/805 X |
| 4,084,840 | 4/1978 | Buff et al. ........................ | 297/478 |

Primary Examiner—John J. Love
Assistant Examiner—Milton L. Smith
Attorney, Agent, or Firm—Cushman, Darby & Cushman

[57] ABSTRACT

A seat belt system for a vehicle including an impact energy absorbing device mounted between a seat belt for restraining an occupant and a seat belt anchor means. The impact energy absorbing device includes a cutter, a member disposed in juxtaposed relation to the cutter and adapted to be sheared by the cutter as the member and the cutter move relative to each other, and a cutter supporting member to which the cutter is securely fixed. When the vehicle collides, the impact energy is absorbed by the shearing of the member by the cutter. The shearing load exerted on the member may vary depending on the tension speed exerted on the seat belt at the time of collision, so that the movement of the occupant caused by the collision can be confined to a substantially constant range at varying collision velocities and a secondary collision of the occupant against an instrument panel or the like can be prevented.

5 Claims, 7 Drawing Figures

SEAT BELT SYSTEM FOR VEHICLE

BACKGROUND OF THE INVENTION

1. Field of the Invention

This invention relates to a seat belt system for a vehicle, such as an automotive vehicle, having an impact energy absorbing device which can be utilized for restricting an occupant restraining load exerted on a seat belt by the movement of an occupant when a vehicle is in a collision.

2. Description of the Prior Art

In one type of impact energy absorbing device of the prior art used with a seat belt system, the material for producing threads for weaving a seat belt or the manner in which threads are woven into a seat belt is varied so that the seat belt itself may be able to absorb the kinetic energy of an occupant of a vehicle when a collision occurs. Another type of such device known in the art includes a pipe connected to a seat belt and adapted to be expanded when a collision occurs, so that the impact energy can be absorbed by the expanded pipe.

In the aforesaid devices of the prior art, if an energy absorbing member is given a load of a predetermined value beforehand or the load is set at a value at which an occupant can be prevented from suffering injury when a collision occurs at a speed of say 50 mile/hour, the occupant would possibly be subjected to a shock of high intensity and suffer injury when a collision occurs at a speed of say 30 mile/hour. The fact that the set load value does not vary depending on the collision speed would naturally result in the amount of movement of the occupant in the space in the vehicle varying depending on the collision speed because the kinetic energy given to the occupant by a collision varies depending on the collision speed. Thus, the devices of the prior art have the disadvantage that, since the load of the energy absorbing member does not vary depending on the collision speed, it is impossible to effectively utilize the space in the vehicle.

SUMMARY OF THE INVENTION

This invention has as its object the provision of a seat belt system for a vehicle having an impact energy absorbing device which obviates the disadvantage of the prior art by utilizing a member connected to a seat belt and formed with a reduced thickness portion adapted to be sheared by a cutter when impact energy is exerted on the seat belt as a result of the collision of the vehicle so as to absorb the impact energy by the shearing of the reduced thickness portion of the member. The invention is based on the discovery that a shearing load exerted on the member, either cylindrical or planar in form, varies depending on the shearing speed, or the member has a characteristic such that the shearing load exerted on the member depends on the speed. Thus the impact energy absorbing device according to the invention is capable of varying the shearing load exerted on the member to be sheared at varying collision speeds, so that the movement of an occupant in the space in the vehicle can be brought to a maximum value at which no secondary collision of the occupant against an instrument panel or the like occurs and the safety of the occupant can be ensured at the time of collision, notwithstanding variations of the collision speed.

According to the invention, there is provided a seat belt system for a vehicle comprising a seat belt for restraining an occupant, a seat belt anchor means firmly secured to a vehicle body, and an impact energy absorbing device arranged between the seat belt and the seat belt anchor means to connect them to each other, the impact energy absorbing device comprising a cutter having a cutting edge, a member disposed in juxtaposed relation to the cutter and adapted to be sheared by the cutter as the member and the cutter move relative to each other, and a cutter supporting member to which the cutter is securely fixed, so that the impact energy can be absorbed by the shearing of the member by the cutter when the vehicle collides.

The above and other objects, features and advantages of the invention will become more apparent from the description of the illustrative embodiments thereof set forth hereinafter when considered in conjunction with the accompanying drawings.

DESCRIPTION OF THE PREFERRED EMBODIMENTS

Figures 1, 2:
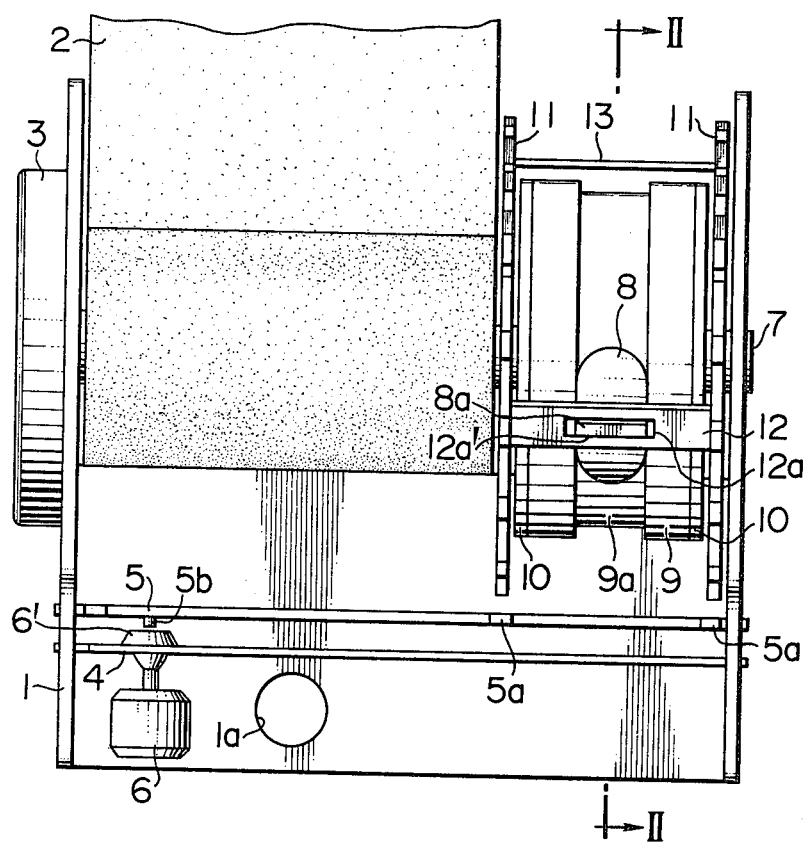
FIGS. 1 to 3 show a first embodiment of the invention, FIG. 1 being a front view of the first embodiment in an inoperative position, FIG. 2 being a sectional view taken along the line II—II in FIG. 1, and FIG. 3 being a sectional view similar to FIG. 2 but showing the first embodiment in an operative position.
Figure 3:
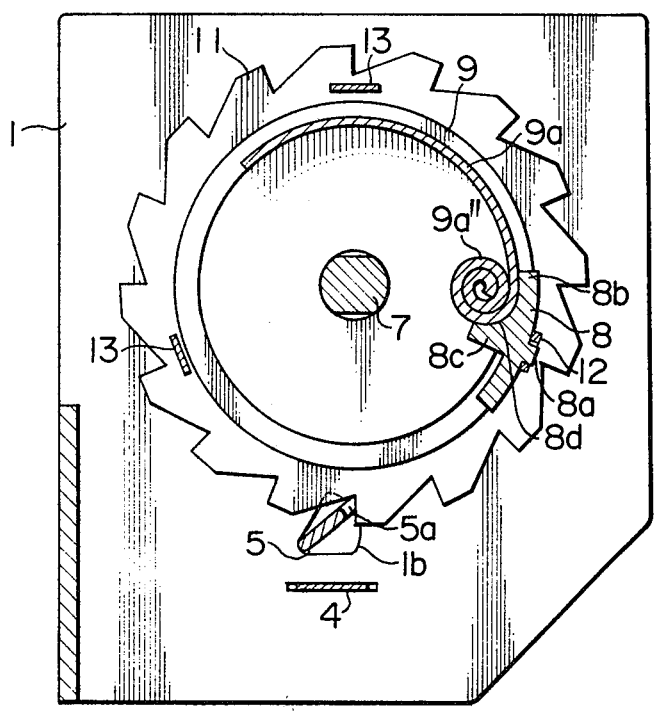

A first embodiment of the invention will now be described by referring to FIGS. 1 to 3. A retractor body 1 is securely fixed through an opening 1a to a vehicle body. A seat belt 2 is attached at one end thereof to a belt take-up shaft 7 and fastened at the other end thereof to an anchor or buckle (not shown). When released from the anchor or buckle, the seat belt 2 is wound on the belt take-up shaft 7 by the resilience of a spiral spring located in a barrel 3. A bracket 4 is rigidly secured to the retractor body 1 for movably supporting a pendulum 6. The retractor body 1 is formed therein with an arcuate shaped hole 1b in which a pawl plate 5 is pivotally supported at opposite ends thereof and has a pair of pawls 5a disposed in spaced relation to each other and projecting therefrom, and a downward projection 5b which is disposed in juxtaposed relation to a head 6' of the pendulum 6.

A member 9 to be sheared is cylindrical in shape and has a reduced thickness portion substantially in the form of a letter U in cross sectional shape and extending peripherally substantially in the central portion of the member 9. The member 9 is firmly secured at opposite ends thereof to holders 10 of disc shape. The reduced thickness portion 9a is formed therein with an opening 9a' which receives a cutting edge 8c of a cutter 8, the cutting edge 8c being formed with an arcuate portion 8d at its shearing part. Two gear wheels 11 are interconnected by supporting bars 12 and 13 spaced apart from one another peripherally and extending axially of the member 9, so that the gear wheels 11 act as a unit. The supporting bar 12 is formed in one portion thereof with a slot 12a which is slightly larger in size than a projection 8a of the cutter 8. The slot 12a has one side 12a' which serves as a stopper for the cutter 8 which is forced against the member 9 by the supporting bar 12 which functions as a cutter supporting member. The cutter 8 has a portion 8b functioning as a guide and fitted in the U-shaped groove in the member 9 constituting the reduced thickness portion 9a to prevent dislodging of the cutter 8 from the reduced thickness portion 9a when shearing of the member 9 is effected.

The holders 10 are securely fixed to the belt take-up shaft 7 which has the seat belt 2 attached thereto at one end of the belt 2. Thus, the member 9 to be sheared acts as a unit with the seat belt 2. The gear wheels 11 can rotate independently of the belt take-up shaft 7, although the latter extends through the former. However, the engagement of the projection 8a of the cutter 8 in the slot 12a formed in the supporting plate 12 holds the gear wheels 11 against axial movement with respect to the seat belt take-up shaft 7, so that the two gear wheels 11 are maintained in positions in which each of them is juxtaposed against one of the two pawls 5a.

The operation of the impact energy absorbing device constructed as aforementioned will be described. When the device is inoperative, the pawls 5a are out of engagement with the respective gear wheels 11 as shown in FIG. 2. Thus, clockwise rotation of the seat belt take-up shaft 7 brought about by the paying-out of the seat belt 2 causes the member 9 to rotate clockwise, because the holders 10 are firmly secured to the shaft 7. As a result, the gear wheels 11 are also rotated clockwise through the supporting bar 12 which is in engagement with the cutter 8, because the cutter 8 is in turn in engagement with the reduced thickness portion 9a of the member 9.

When the vehicle collides, the vehicle is suddenly decelerated and the pendulum 6 moves in swinging motion and its head 6' engages said projection 5b to move the pawl plate 5 upwardly, thereby bringing the pawls 5a into engagement with the respective gear wheels 11 to lock the latter. This keeps the cutter 8 in a position in which it is located when the gear wheels 11 are locked. Meanwhile, sudden acceleration of the occupant causes impact energy to act on the seat belt 2, causing the seat belt 2 to be paid out of the shaft 7. Rotation of the seat belt take-up shaft 7 causes the member 9 to rotate together with the shaft 7 and forces the reduced thickness portion 9a of the member 9 against the arcuate portion 8d of the cutter 8. Thus, as shown in FIG. 3, the reduced thickness portion 9a is sheared by the cutter 8 to form a coiled portion 9a" coiled along the arcuate portion 8d, and the sheared fragment is held within the cylindrical member 9.

Since the guide 8b is fitted in the U-shaped groove constituting the reduced thickness portion 9a, the cutter 8 is prevented from rotating and shearing a large thickness portion of the member 9.

Figure 4:
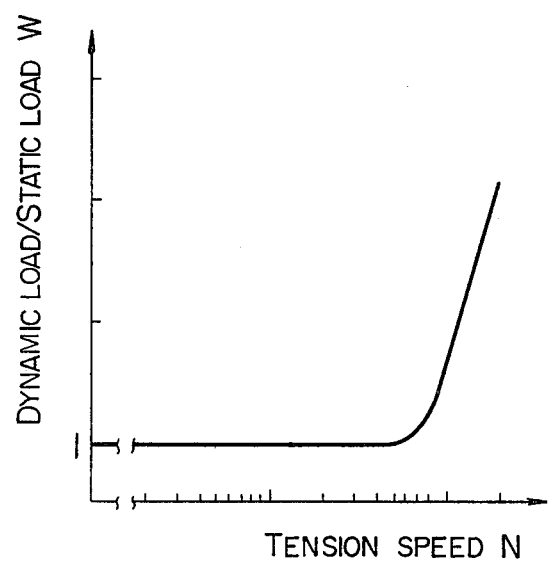
FIG. 4 is a graph showing the dynamic load/static load of the first embodiment in relation to the tension speed.

In this embodiment, the reduced thickness portion 9a of the member 9 is formed of sheet iron. When the reduced thickness portion 9a is sheared, the shearing load is related to the tension speed N as shown in FIG. 4. From FIG. 4, it will be seen that if the tension speed N is high, then a great shearing load is exerted, and if the tension speed N is low, then a small shearing load is exerted. Stated differently, the shearing load exerted on the member 9 is proportional to the collision speed. If the tension speed is constant, the load has a characteristic that it is flat with respect to the displacement.

In FIG. 4, W designates the ratio of the dynamic load (the load exerted by the cutter 8 when the reduced thickness portion 9a is sheared by the cutter) to the static load (the static load exerted by the cutter 8 when the cutter is in engagement with the reduced thickness portion). The graph in FIG. 4 indicates that, although the load ratio W remains unity until the tension speed reaches a certain level, the dynamic load suddenly grows large in accordance with an increase in tension speed after the tension speed has exceeded a predetermined level. It will be seen that the shearing load is dependent on the tension speed.

Figure 5:
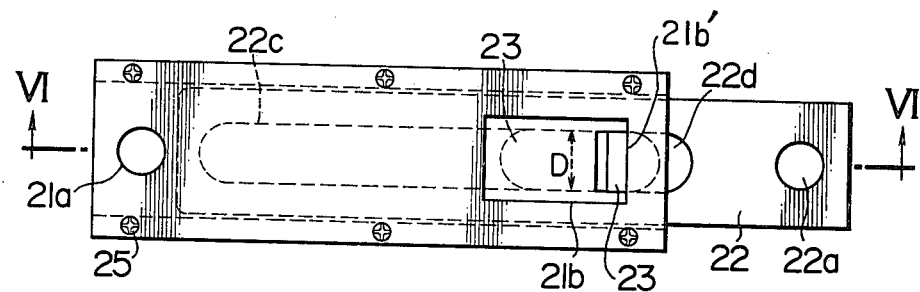
FIGS. 5 to 7 show a second embodiment of the invention, FIG. 5 being a plan view of the second embodiment in an inoperative position, FIG. 6 being a sectional view taken along the line VI—VI in FIG. 5, and FIG. 7 being a sectional view similar to FIG. 6 but showing the second embodiment in an operative position.
Figure 6:
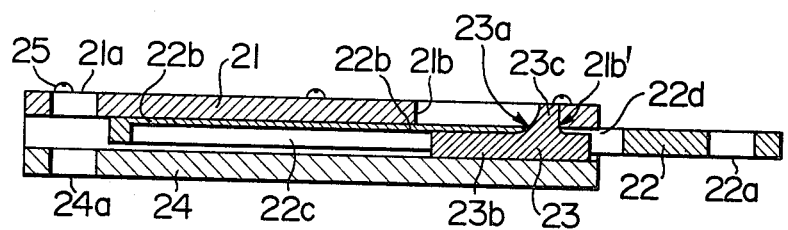
Figure 7:
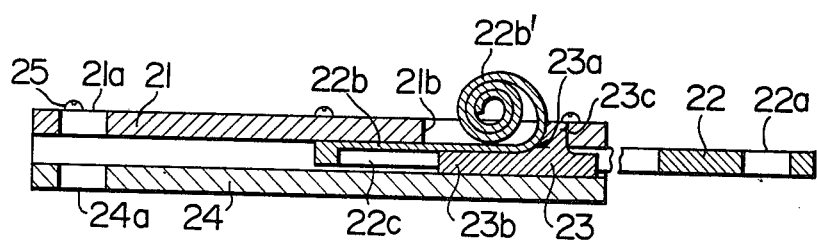

A second embodiment of the invention, wherein the impact energy absorbing device is connected to the anchor means, will now be described by referring to FIGS. 5 to 7. As shown, an upper supporting plate 21 and a lower supporting plate 24 support therebetween a member 22 to be sheared and a cutter 23. The upper supporting plate 21 is planar and the lower supporting plate 24 is concave, and the two plates 21 and 24 are held together by means of screws 25 each in engagement with one of through holes formed in the upper supporting plate 21 and one of threaded holes formed in the lower supporting plate 24. The plates 21 and 24 are formed therein with openings 21a and 24a respectively which are vertically aligned for attaching the plates 21 and 24 to a vehicle body. The upper supporting plate 21 is formed therein with a sheared fragment take-out opening 21b for taking out a fragment sheared from the member 22. The opening 21b has one side 21b' which serves as a stopper for the cutter 23 which is not directly fixed.

The member 22 to be sheared is in the form of a plate which is formed therein with a seat belt fastening opening 22a and on its underside with a groove 22c in the form of a letter U in cross sectional shape and of a width large enough to receive the cutter 23 therein. The portion of the member 22 which has the groove 22c formed on its underside constitutes a reduced thickness portion 22b which is formed in one portion thereof with an aperture 22d for permitting a head 23c of the cutter 23 to extend upwardly therethrough.

The cutter 23, whose head 23c extends upwardly through the aperture 22d in the member 22 into the sheared fragment take-out opening 21b in the upper supporting plate 21, includes a guide 23b which is fitted in the groove 22c on the underside of the member 22, so that the member 22 to be sheared and the cutter 23 are disposed relative to each other such that they are oriented in the same direction at all times.

The operation of the impact energy absorbing device constructed as aforementioned as the second embodiment of the invention will be described. When the vehicle collides and impact energy acts on the seat belt due to the sudden acceleration of the occupant, tensile forces acting in opposite directions are exerted on the member 22 to be sheared which is attached to the seat belt for restraining the occupant and the upper and lower supporting plates 21 and 24 firmly attached to the vehicle body, because the other end of the seat belt attached at one end to the member 22 is fastened to a conventional anchor or retractor (not shown) including a mechanism for locking the seat belt in the case of a collision. Since the upper and lower supporting plates 21 and 24 are firmly attached to the vehicle body, they are unable to move, with the result that the member 22 to be sheared is withdrawn from between the upper and lower supporting plates 21 and 24. At this time, the cutter 23 is stopped by one side 21b' of the sheared fragment take-out opening 21b in the upper supporting plate 21, and the reduced thickness portion 22b of the member 22 is forced against a cutting edge 23a of the cutter 23. Further exertion of the tensile force on the member 22 results in the reduced thickness portion 22b of the member 22 being sheared with a width D by the cutter 23 as shown in FIG. 5, and a sheared fragment 22b' of the reduced thickness portion 22b is coiled around an arcuate portion 23a of the cutter 23 as shown in FIG. 7. Thus the sheared fragment does not need a large space for receiving it.

The second embodiment is capable of exerting the same shearing load on the member 22 as the shearing load exerted on the member 9 in the first embodiment. By using material other than iron, it is possible to vary the degree of dependence of the shearing load on the tension speed.

While the present invention has been shown and described as having an application in a seat belt system, it is to be understood that the invention is not limited to this application, and that the impact energy absorbing device according to the invention can be used in other cases wherein an object to be protected is allowed to move within a predetermined protection space and then become stationary, when a collision or other accident occurs.

From the foregoing description, it will be appreciated that, in the present invention, the higher the speed of relative movement, the greater is the energy required for effecting cutting (shearing). Thus, the impact energy absorbing device according to the invention offers the advantage that the amount of relative movement can be confined to a substantially constant range, because the device exerts a relatively low relative movement restraining force when the speed of relative movement is low and is capable of quickly stopping the relative movement when the speed of relative movement is high. This phenomenon will be described by referring to an application in a seat belt system. When a collision occurs while the vehicle is running at high speed, the device strongly restrains the occupant and prevents the occupant from moving forwardly a large distance, so that the amount of forward movement of the occupant can be kept substantially at the same level as the amount of forward movement of the occupant at the time of collision at low speed. The invention is thus capable of minimizing the impact energy exerted on the occupant by effectively utilizing the space in the vehicle and of preventing a secondary collision of the occupant against an instrument panel or the like.

What is claimed is:

1. A seat belt system for a vehicle comprising:
   a seat belt for restraining an occupant;
   seat belt anchor means adapted to be firmly secured to a vehicle body; and
   an impact energy absorbing device interposed between said seat belt and said seat belt anchor means to connect them, said impact energy absorbing device comprising
   a cutter having a cutting edge formed with an arcuate portion at its shearing part,
   a member connected to said seat belt to be moved thereby when collision occurs and disposed in juxtaposed relation to said cutter and having a recessed U-shaped groove formed therein to provide a portion of constant reduced thickness adapted to be sheared by said cutter during movement of said member against said cutter, and
   a cutter supporting member for supporting said cutter such that said cutter is held stationary when collision occurs, whereby said cutter shears said member when the vehicle collides to thereby absorb the impact energy acting on the seat belt,
   said cutter further having a first guide portion disposed flat in said U-shaped groove and extending therein in a direction opposite to said movement of said member so as always to be upstream of said cutting edge to keep said cutter in proper cutting position,
   said cutter further having a second guide portion on the opposite end of said cutting edge from said first guide portion and extending at an angle thereto with an arcuate surface which continues the said arcuate portion of said shearing part for coiling the shorn reduced thickness portion into a tight coil on the side of said reduced thickness portion opposite said U-shaped groove.

2. A seat belt system as claimed in claim 1, wherein said member is in the form of a plate and housed in said seat belt anchor means.

3. A seat belt system for a vehicle, comprising:
   a seat belt for restraining an occupant;
   seat belt anchor means adapted to be firmly secured to a vehicle body; and
   an impact energy absorbing device interposed between said seat belt and said seat belt anchor means to connect them, said impact energy absorbing device comprising
   a cutter having a cutting edge,
   a member disposed in juxtaposed relation to said cutter and having a U-shaped groove formed therein to provide a portion of constant reduced thickness adapted to be sheared by said cutter during relative movement of said member and said cutter, and
   a cutter supporting member for supporting said cutter, whereby said cutter shears said member when the vehicle collides to thereby absorb the impact energy acting on the seat belt,
   said cutter supporting member being cylindrical in shape and formed of a thin sheet metal and housed in said seat belt anchor means.

4. A seat belt system for a vehicle, comprising:
   a seat belt for restraining an occupant;
   seat belt anchor means adapted to be firmly secured to a vehicle body; and
   an impact energy absorbing device interposed between said seat belt and said seat belt anchor means to connect them, said impact energy absorbing device comprising
   a cutter having a cutter edge formed with an arcuate portion at its shearing part,
   a member disposed in juxtaposed relation to said cutter and adapted to be sheared by said cutter during relative movement of said member and said cutter, and
   a cutter supporting member for supporting said cutter, whereby said cutter shears said member when the vehicle collides to thereby absorb the impact energy acting on the seat belt,
   said cutter supporting member being cylindrical in shape and formed of a thin sheet metal and housed in said seat belt anchor means.

5. A seat belt system as claimed in claim 3 or 4, wherein said seat belt anchor means includes a seat belt retractor, and said member is housed in said retractor.

* * * * *